United States Patent [19]
Smith

[11] Patent Number: 5,094,325
[45] Date of Patent: Mar. 10, 1992

[54] VEHICLE SHOCK ABSORBER ASSEMBLY

[76] Inventor: J. Marlow Smith, 4819 Jumano Ave., San Diego, Calif. 92117

[21] Appl. No.: 541,335

[22] Filed: Jun. 21, 1990

[51] Int. Cl.⁵ .............................................. F16F 9/08
[52] U.S. Cl. .................................... 188/282; 188/314; 188/319
[58] Field of Search ............... 188/281, 282, 288, 279, 188/289, 312, 314, 316, 322.13, 319, 299, 284, 286, 287, 285, 300, 311, 313

[56] References Cited

U.S. PATENT DOCUMENTS

| | | | |
|---|---|---|---|
| 1,394,063 | 10/1921 | Camp | 188/319 |
| 2,347,803 | 5/1944 | Allen et al. | 188/319 X |
| 2,493,290 | 1/1950 | Hearne | 188/319 |
| 2,812,717 | 11/1957 | Brown | 103/52 |
| 3,063,518 | 11/1962 | Stark | 188/88 |
| 3,362,508 | 1/1968 | Mayer | 188/88 |
| 3,365,033 | 1/1968 | Willich | 188/88 |
| 3,559,776 | 2/1971 | Schutze | 188/299 |
| 3,625,321 | 12/1971 | Lutz | 188/298 |
| 3,848,710 | 11/1974 | Thompson et al. | 188/282 X |
| 4,010,829 | 3/1977 | Naito et al. | 188/282 X |
| 4,337,850 | 7/1982 | Shimokura | 188/319 |
| 4,683,992 | 8/1987 | Watanabe | 188/299 |
| 4,813,519 | 3/1989 | Matsubara et al. | 188/285 X |
| 4,953,671 | 9/1990 | Imaizumi | 188/282 X |
| 4,973,854 | 11/1990 | Hummel | 188/287 X |

FOREIGN PATENT DOCUMENTS

| | | | |
|---|---|---|---|
| 703562 | 4/1966 | Italy | 188/282 |
| 0129444 | 7/1985 | Japan | 188/282 |
| 215660 | 2/1966 | Sweden | 188/282 |

Primary Examiner—Matthew B. Graham
Assistant Examiner—Peter M. Poon
Attorney, Agent, or Firm—Brown, Martin, Haller & McClain

[57] ABSTRACT

A shock absorber assembly for mounting between a vehicle frame and wheel assembly including a cylinder containing a substantially incompressible fluid and a piston slidably mounted in the cylinder to divide it into two separate chambers on opposite sides of the piston. A hollow piston rod is connected to the piston at one end and extends out of one end of the cylinder, where it is mounted in a base assembly. A fluid flow passageway in the piston rod communicates between the two chambers. An adjustment rod slidably mounted in the piston rod controls the size of the fluid flow passageway. A biasing assembly acts between the piston and adjustment rods to urge them relative to one another so as to increase the size of the fluid flow passageway, allowing a degree of automatic adjustment to the compression and rebound rates of the assembly dependent on the prevailing road conditions.

12 Claims, 2 Drawing Sheets

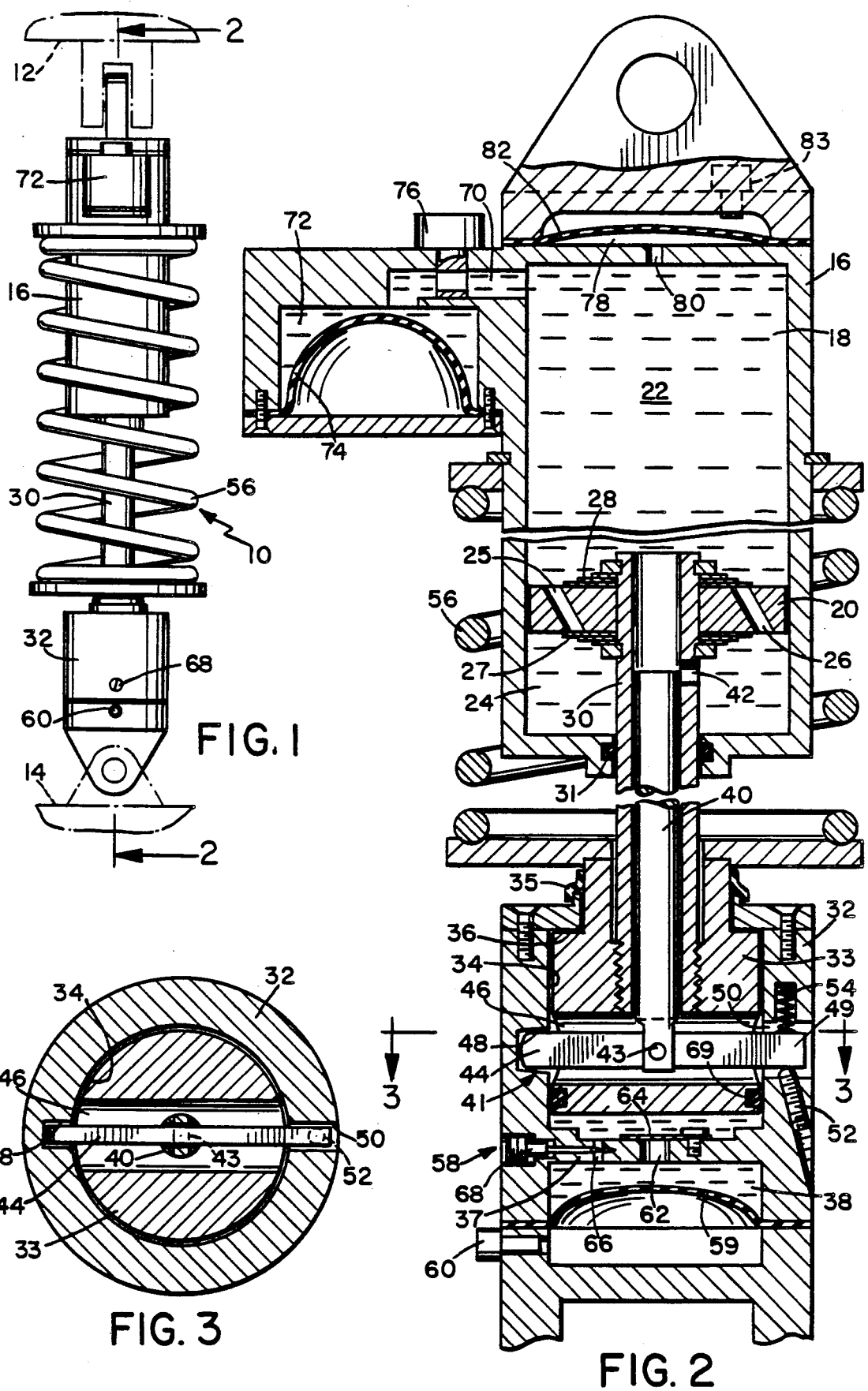

VEHICLE SHOCK ABSORBER ASSEMBLY

BACKGROUND OF THE INVENTION

1. Field of the Invention

The present invention relates generally to shock absorber assemblies for vehicles.

2. Background Information

One well known type of vehicle shock absorber consists of a cylinder filled with a shock absorbing or damping liquid, which is substantially incompressible, and a piston slidably mounted in the cylinder and connected to a piston rod which extends out of one end of the cylinder. The shock absorber is connected between the vehicle frame and wheel assembly, such that when the wheel hits a bump or other obstacle, the piston will slide into the cylinder with fluid on one side of the piston flowing through orifices in the piston to the other side to allow the piston movement. This is known as the compression stroke. The impact is damped by the resistance of the fluid to the piston movement, and the degree of damping will be determined, at least in part, by the size of the orifices. The piston is typically biassed in the opposite direction via a spring, so that when the wheel has moved over the obstacle or bump, the spring urges the piston back out of the cylinder in a so-called rebound stroke in which fluid flows through orifices in the piston in the opposite direction, with the rebound being similarly damped.

There are some problems with this basic arrangement. If the rebound is too slow, the shock absorber may not have fully recovered before a subsequent bump or obstacle is hit by the wheel, causing a hard impact felt by the occupants of the vehicle. A series of successive bumps or obstacles, as is common when driving "off-road" or "all terrain" vehicles, may give rise to a problem known as "packing" in which the piston recovers progressively less and less and eventually you have no impact damping at all, with the wheel leaving the ground after a bump and impacting hard with the next bump.

This problem can be partially overcome by making the rebound faster. Some shock absorbers provide a degree of rebound control by having a hollow piston rod with a valve rod mounted in the piston rod, the valve rod being movable by a manual adjustment mechanism to control the size of one or more rebound orifices in the piston rod. The valve rod is moved axially along the piston rod to increase or decrease the size of the rebound orifices, increasing or decreasing the rate at which fluid can flow between the opposite ends of the cylinder during rebound. Thus a faster rebound can be provided by making the rebound opening or openings larger. However, the rebound must be set manually prior to driving the vehicle, and if the rebound is too fast, the action will be uncomfortable for the vehicle occupants as the vehicle will spring up very quickly following an impact. With a constant rebound setting, the rebound will always be too fast in some situations and too slow in others.

SUMMARY OF THE INVENTION

It is an object of this invention to provide an improved shock absorber assembly.

According to the present invention, a shock absorber assembly is provided which comprises a cylinder containing a substantially incompressible fluid and a piston slidably mounted in the cylinder to divide the cylinder into separate chambers on opposite sides of the piston. A hollow piston rod extends from the piston out of one end of the cylinder, the piston rod having at least one fluid flow passageway connecting the two chambers together. An adjustment rod is slidably mounted in the piston to control the flow cross-section of the passageway. The piston and adjustment rods are connected together at their outer ends by a base assembly allowing a limited degree of relative axial movement between the rods between first and second end positions to vary the flow cross-section, the flow cross-section being largest in the first end position. A biassing assembly acts between the rods to urge them towards the first end position. When the shock absorber assembly is mounted between a vehicle frame and wheel assembly, any ground pressure applied to the wheel assembly will oppose the biassing assembly and urge the rods in the opposite direction to reduce the flow cross-section. This allows the flow cross-section between the cylinder chambers to be varied to some extent automatically while driving, the variation being dependent on the current road conditions.

Preferably, the adjustment rod is itself adjustably mounted in the base assembly by an adjustable locking mechanism which allows the standard flow cross-section to be varied manually. The relative axial movement between the rods provides continuous adjustment of the flow cross-section about that standard during operation of the shock absorber, in a manner which tends to produce a smoother, more comfortable ride. Since the biassing assembly urges the rods into a relative position in which the flow cross-section between the chambers is increased, in the case of light ground pressure or where the wheels of a vehicle leave the ground, the biassing assembly will increase the flow between the chambers, allowing a relatively fast rebound. In contrast, when the wheels are on the ground and under pressure, the piston rod will be urged into the cylinder in a compression stroke, and the rods will move relative to one another in the opposite direction to reduce the flow between the chambers, producing a slower rebound.

In a preferred embodiment of the invention, the piston rod is mounted in the shock base assembly by an arrangement allowing a limited degree of movement or free play between the piston rod and shock base, which will also provide a variation in the flow cross-section by varying the relative positions of the adjustment member, which is fixed relative to the shock base, and the piston rod, which can move relative to the shock base. Movement of the piston rod further into the cylinder will tend to increase the flow cross-section, while movement out of the cylinder will tend to decrease the flow cross-section. The biassing assembly may comprise a resilient biassing member acting between the shock base and piston rod in a direction tending to urge the piston rod and adjustment member apart. In one embodiment of the invention, the biassing assembly comprises a fluid-filled chamber which opposes movement of the piston rod out of the cylinder, and biases the piston rod into the cylinder.

This invention will alter the shock response both during the compression stroke and the rebound stroke, since the relative movement allowed between the piston and adjustment rods will vary the flow cross-section for fluid flow in both directions. The arrangement is such that the rebound will be faster when the wheels are under light pressure or off the ground, and slower when the wheels are on the ground and under pressure. This means that the wheels will tend to follow the ground more closely in bumpy terrain. In a compression stroke, the inward movement of the piston rod will move the adjustment rod inwardly to progressively reduce the size of the opening, progressively increasing compression damping. This provides a soft start on initial impact with a bump or obstacle, with a gradual increase in damping, rather than a sudden, hard impact with full compression damping.

BRIEF DESCRIPTION OF THE DRAWINGS

The present invention will be better understood from the following detailed description of a preferred embodiment, taken in conjunction with the accompanying drawings, in which like reference numerals refer to like parts, and in which:

FIG. 1 illustrates a shock absorber installation according to a referred embodiment of the present invention;

FIG. 2 is an enlarged sectional view taken on the line 2—2 of FIG. 1;

FIG. 3 is a sectional view taken on the line 3—3 of FIG. 2;

DESCRIPTION OF THE PREFERRED EMBODIMENTS

Figure 4:
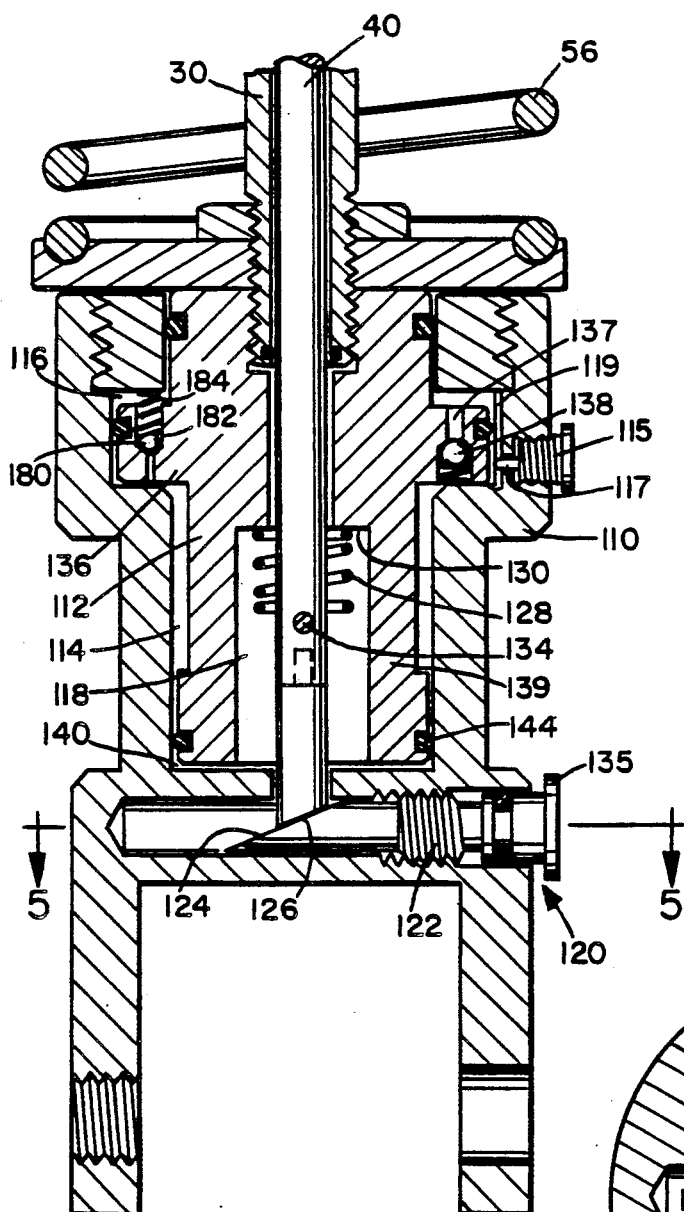
FIG. 4 is a view similar to FIG. 2 illustrating a modified piston rod mounting and base biassing assembly in the shock base cylinder.

FIG. 1 of the drawings illustrates a shock absorber assembly 10 according to a preferred embodiment of the present invention installed between part of a vehicle frame 12 and a wheel assembly or axle 14. The shock absorber assembly is best illustrated in FIG. 2 and basically comprises a cylinder 16 containing a substantially non-compressible fluid 18 such as oil, and a piston 20 slidably mounted in the cylinder to divide the cylinder into two separate chambers 22,24, one of which is referred to as the compression chamber 22, and the other of which is known as the rebound chamber 24. Throttle openings or ports 25, 26 in piston 20 allow movement of piston 20 in the cylinder, one of the ports 25 being closed on the lower face of piston 20 via one-way compression stroke throttle valve or compression spring washers 27 and the other port 26 being closed on the upper face of piston 20 via one-way rebound stroke throttle valve or rebound spring washers 28.

A hollow piston rod 30 is secured at one end to a central opening in piston 20 and extends from piston 20 out through an opening in the lower end of cylinder 16. An O-ring seal 31 provides a sliding seal around rod 30 to prevent or restrict leakage from chamber 24. The projecting end of the piston rod 30 is mounted in a shock base cylinder 32 as illustrated in FIG. 2. The free end of the piston rod 30 is secured to shock base piston 33 which is slidably mounted in an upper chamber 34 of cylinder 32. Annular seal member 35 provides a sliding seal between piston 33 and the opening into cylinder 34. Piston 33 is free to move a limited axial distance between the opposite ends of chamber 34, as defined between end wall 36 of the cylinder and internal dividing wall 37, which separates the cylinder into upper chamber 34 and lower chamber 38.

A rebound adjusting rod 40 is slidably mounted in hollow piston rod 30 and extends out of the lower end of rod 30, where it is secured to shock base cylinder 32 via a manual adjustment mechanism 41, as illustrated in FIGS. 2 and 3. The adjustment mechanism 41 adjusts the position of the inner end of adjusting rod 40 relative to orifice 42 in piston rod 30, and thus controls the flow cross-section between the two chambers 22,24 in the shock absorber cylinder, as explained in more detail below. Any suitable adjustment mechanism may be provided. In the embodiment illustrated in FIG. 2, the lower end of rod 40 is pivotally secured via pin 43 to lever arm 44, which extends across chamber 34 via a diametrical through bore 46 in shock base piston 33. The diameter of bore 46 is sufficient to allow the piston 33 to move the desired distance up and down in chamber 34 relative to fixed rod 40. One end of lever arm 44 is retained in indent 48 in the side wall of chamber 34, while the opposite end 49 extends into diametrically opposed through bore 50 as illustrated in FIG. 2. An adjustment screw 52 acts on the projecting end 49 of lever arm 44, and is opposed by return spring 54. Thus if screw 52 is extended to push the end 49 of lever arm 44 upwardly, rod 40 will be moved inwardly relative to piston rod 30 and thus the effective size of orifice 42 will be reduced. Conversely, if screw 52 is moved downwardly, so that return spring 54 forces the end 49 of lever arm 44 downwardly an equivalent amount, rod 40 is moved outwardly relative to piston rod 26, increasing the size of orifice 42. It will be understood that movement of rod 40 may alternatively control the biassing force of a spring valve controlling an orifice opening, instead of directly controlling the orifice size as in FIG. 2.

A rebound spring 56 acts between shock absorber cylinder 16 and shock base piston 33 to urge piston 20 downwardly as viewed in FIG. 2. A base biassing assembly 58 in the shock base cylinder 32 opposes spring 56 and tends to urge shock base piston 33 upwardly in chamber 34, thus increasing the size of orifice 42. In a first embodiment of the invention illustrated in FIG. 2, the base biassing assembly comprises a fluid or hydraulic biassing mechanism acting between shock base cylinder 32 and piston 33. However, any suitable biassing mechanism may be used in alternative arrangements, for example a biassing spring acting between the cylinder 32 and piston 33 in an equivalent manner.

Referring now to the base biassing assembly as illustrated in FIG. 2, the assembly basically comprises a fluid filled lower chamber with a pressurized, gas-filled bladder 59 in the chamber biassing piston 33 upwardly and opposing downward movement of the piston. Control valve 60 allows the gas pressure in bladder 59 to be adjusted as required. Lower chamber 38 communicates with upper chamber 34 via central opening 62 in dividing wall 37. Opening 62 is normally closed by a one-way flap valve 64. A secondary flow or bleed orifice 66 in wall 37 allows a limited amount of flow from the upper chamber to the lower chamber, as determined by manually adjustable needle valve 68, adjustable via a fine tuning screw, which controls the rate of piston descent. Although a needle valve 68 is shown, it will be understood that other alternative valves may be used, such as spring-loaded washers. An O-ring seal 69 on piston 33 prevents or restricts fluid leakage around the piston as it descends in chamber 34.

The compression chamber 22 is connected via passageway 70 to a standard compensation chamber 72 containing a pressurized gas-filled bladder 74. This allows displacement of the non-compressible fluid 18 to permit inward movement of piston into cylinder 16, by compression of bladder 74. A suitable adjustable throttle valve 76 controls the rate of flow of fluid into chamber 72 and back out into chamber 22 in the rebound stroke. Preferably, an additional or auxiliary compensation chamber 78 at the top of cylinder 16 communicates via restricted passageway 80 with the chamber 22. Chamber 78 also contains a pressurized, gas-filled bladder 82. Pressure of gas in bladder 82 can be controlled via valve 83. The auxiliary compensation chamber acts to reduce the initial compression damping, as will be explained in more detail below. Auxiliary chamber 78 could be provided anywhere in chamber 22 and may alternatively comprise two or more sub-chambers containing pressurized bladders mounted on the upper face of piston 20.

Operation of the shock absorber assembly described above will now be explained in more detail. In order that this operation can be better understood, operation of a standard shock absorber without the biassing assembly 58 will first be described. In a standard shock absorber, the piston rod will be fixed relative to the shock base and thus, once the adjusting rod position has been manually set, the size of rebound orifice 42 in the piston rod will be fixed throughout operation of the shock absorber. When the wheel hits a bump or other obstacle, the piston 20 will be forced inwardly, opposing or compressing return spring 56, the compression stroke being damped by the relatively incompressible fluid in chamber 22, which must be urged out of the chamber via restricted orifice 70 into compensation chamber 72 and via orifices 25 and 42 into chamber 24. Thus the setting or sizes of orifices 70 and 42 and the compression washers 27 will control the compression damping, with the damping being higher when the orifices are smaller, reducing the rate of flow out of the chamber. Compression washers 27 cannot be adjusted. Also, initial movement of piston 20 will be opposed by the frictional resistance to movement between piston 20 and the internal walls of cylinder 16. This can produce a relatively hard initial impact to a passenger in the vehicle.

At the top of a bump or obstacle, the compression stroke ends and the rebound stroke begins, the piston being urged in the opposite direction out of cylinder 16 by return spring 56, the rebound rate being restricted by the fluid in chamber 24, some of which must flow back into chamber 22 via orifices 26 and 42 to permit piston 20 to descend. Thus, rebound washers 28, which cannot be adjusted, control the rebound damping to a large extent. The actual rebound damping is controlled by the rebound washers 28 and adjusting rod 40. If the rebound rate is set too slow, a subsequent bump may be reached before the piston is fully extended, causing a relatively hard impact to be felt. With a series of bumps, the wheel may leave the ground following a bump, particularly where the ground slopes down faster than the rebound can follow. In extreme cases, the shock absorber may "pack down" after a series of bumps from which it has been unable to recover completely. In contrast, if the rebound orifice size is set too large, producing a faster rebound, the system will spring back quickly following a compression stroke, springing the vehicle frame upwardly in an undesirable fashion. Thus, rebound settings must always be a compromise between these two extremes, and may not be ideal for all road conditions.

The shock absorber assembly illustrated in FIG. 2 compensates for these problems to some extent by allowing the rebound orifice size to be varied automatically while the vehicle is being driven, dependent on the current road conditions. Operation of the base biassing assembly in a compression and subsequent rebound stroke will first be explained. The manual adjustment of the adjusting rod is first set to the desired "normal" rebound opening size, for example as shown in FIG. 2. This may be altered according to the anticipated road conditions, for example the standard opening may be set larger for off-road driving to allow faster rebound. During travel on flat ground, the piston and adjusting rod will remain in the same relative position dependent on the relative biassing force of rebound spring 56 which tends to urge piston 33 downwardly in chamber 34, and biassing force of assembly 58, which tends to urge piston 33 upwardly, along with the upward pressure on the wheel, which tends to urge cylinder 32 upwardly and thus piston 33 down relative to chamber 34. In a normal shock absorber assembly, the rebound spring will have a biassing force of the order of 200 lbs., and the road pressure will normally be around 200 lbs., under normal, flat road conditions. The base biassing assembly pressure may be set as desired, but is preferably set at around 50 lbs. In one example, a biassing pressure of the order of 50 lbs. p.s.i. is applied by the base assembly. Under normal flat road conditions, the weight of the vehicle and its occupants are much greater than this, so that the piston 33 will be at the lower end of chamber 34 in FIG. 2, with opening 42 at its minimum size.

Basically, when the shock base piston 33, and thus the hollow piston rod or shaft 30, is at its lowermost position in the shock base cylinder, the rebound opening will be partially blocked by the adjustment rod 40, to an extent controlled by the setting of adjustment screw 52, and the rebound rate will be relatively slow, with compression damping high. This will be true wherever wheel pressure on the ground is relatively heavy (i.e., flat road conditions, or travelling up bumps in the road). When wheel pressure is light on the ground, or the wheel is in the air (i.e., travelling down bumps), the high pressure in bladder 59 will push the shaft or rod 30 upwardly in cylinder 32, opening the rebound opening 42, and increasing the flow through that opening, producing a fast rebound.

When the wheel travels up a bump, the adjustment rod will be urged up with the shock base cylinder, carrying the piston rod 40 with it, at least at the beginning of the compression stroke. Once the vehicle wheel passes over the top of the bump, the wheel pressure is reduced, and rebound spring 56 urges piston rod 30 downwardly, while the pressure in bladder 59 will urge piston 33 upwardly in its chamber, increasing the rebound orifice size. The lighter the ground pressure, the faster the orifice size, and thus the rebound rate, will increase. Thus, if the wheel should actually leave the ground, losing traction following a bump with a sharp downwards stoke, the shock base piston will move up quickly, increasing the rebound orifice size and the rebound rate. When the wheel touches the ground, the shock base piston will start to move down again, with the downward movement of piston 33 in chamber 34 forcing oil out through bleed orifice 66 into lower chamber 38, compressing bladder 59. Thus, piston rod 30 will move downwardly relative to adjusting rod 40, reducing the size of orifice 42 and gradually increasing the compression damping and decreasing the rebound rate. The size of bleed orifice 66 can be manually adjusted to control the rate at which the piston can descend in chamber 34, and thus can effectively control the rate at which the orifice size 42 is reduced. This provides a relatively soft start to the compression stroke, when the orifice is at its maximum opening size, followed by a gradual increase in the compression damping as the piston moves to the lower end of the chamber 34. Thus, instead of full compression damping being applied at the start of a stroke and being constant during the rebound, which can produce a relatively hard impact to a passenger, the compression starts soft and becomes progressively firmer, which will produce a significantly smoother "ride".

The initial "soft start" may be enhanced, if desired, by the auxiliary compensation chamber 78. However, it will be understood that the auxiliary compensation chamber will only be necessary in some cases, particularly in off-road, or lightweight vehicles. Also, in some cases the base biassing assembly may be eliminated with the auxiliary compensation chamber alone significantly improving the ride, particularly in vehicles intended for use only on smooth, relatively even terrain, and for stable, 4-wheel vehicles such as automobiles which are less likely to lose traction. The auxiliary compensation chamber provides an alternative route for fluid leaving compression chamber 22 at the start of the compression stroke, allowing the initial frictional resistance to movement of the piston to be overcome more easily and reducing the compression damping until the bladder 82 is compressed significantly. Thus, the initial compression damping will be softer than in a standard shock absorber. The pressure of gas in bladder 82 may be set as desired, and will be the same as the pressure in bladder 74, or a little above that pressure, depending on road conditions.

Thus the shock absorber assembly of this invention is self- or automatically- compensating for changes in ground pressure. When the wheel leaves the ground the rebound rate is very fast. While the wheel is on the ground under standard pressure, so that a fast rebound would spring the vehicle up in the air too quickly, the rebound rate is normal. The overall effect is that the vehicle wheels will tend to follow the ground more closely on uneven terrain, and loss of traction will be much less likely to occur. The base biassing assembly compensates for loss of traction by increasing the rebound rate. The adjustment in both compression and rebound rate is automatic and varies automatically depending on the prevailing road conditions, producing a much smoother ride and reducing the risk of "packing down" as a result of a series of consecutive bumps. This assembly may be applied to all types of vehicles, but is particularly useful for motorbikes or off-road vehicles where loss of traction is more of a problem or where uneven ground conditions are commonly encountered. A similar adjustment assembly may also be used on motorbike front hydraulic forks and may be designed to adjust the rebound stroke only, or both the rebound and compression stroke.

Figure 5:
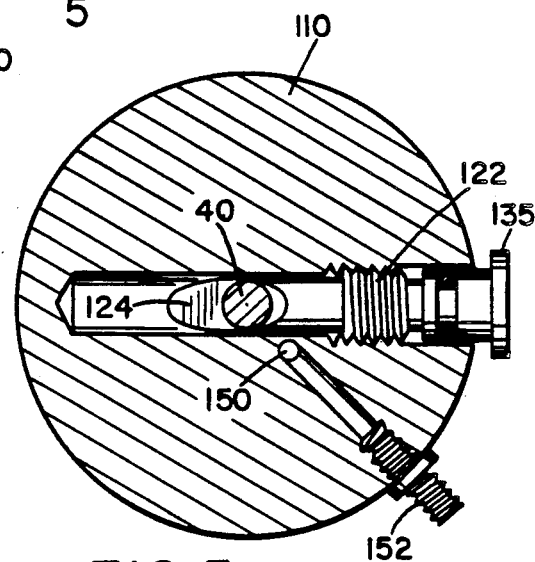
FIG. 5 is a sectional view taken on the line 5—5 of FIG. 4.

FIGS. 4 and 5 illustrate a modified shock base mounting, adjustment and biassing assembly for the piston rod and adjustment rod. The shock absorber cylinder and upper or first ends of the piston and adjustment rods have not been illustrated in FIG. 4 since they will be the same as illustrated in FIG. 2. This arrangement is simpler and less expensive than that illustrated in FIG. 2 since there are less parts involved. As in the first embodiment, the assembly is particularly intended for motorbike rear shocks, and may also be used, in an inverted orientation, on the front forks. However, the assembly may also be used on any vehicle shock absorber.

As in the first embodiment, the shock base mounting includes a shock base cylinder 110 and a shock base piston 112 slidably mounted in an internal chamber 114 in cylinder 110 which permits a limited amount of relative movement between the piston 112 and cylinder 110 as the piston can move between the opposite end walls of enlarged portion 116 of chamber 114. The piston rod 30 is tied directly to the shock base piston 112 so that the two move together, as in the previous embodiment. The lower end of the adjustment rod 40 extends through a chamber 118 in the lower end of shock base piston 112 and engages with an adjustment mechanism 120 at its lower end for manual adjustment of the size of the rebound opening 42 (see FIG. 2) which controls the rebound rate. The adjustment mechanism comprises screw member 122 extending transversely into the shock base cylinder across the lower end of the adjustment rod, and having an upwardly facing wedge 124 at its inner end which engages a correspondingly shaped wedge surface 126 at the lower end of adjustment rod 40. The adjustment rod is urged against adjustment wedge 124 via biassing spring 128 which acts between the closed inner end 130 of chamber 118 in shock base piston 112 and a stop 134 on adjustment rod 40. Thus, movement of the screw member inwardly and outwardly via external adjustment knob 135 will act to move the adjustment rod 40 upwardly or downwardly, respectively, and thus will decrease or increase the size of opening 42. This is a more stable arrangement since there is no sideways movement of rod 40.

The shock base piston 112 is of corresponding stepped diameter to the chamber 114 in shock base cylinder 110. Thus, piston 112 has an enlarged diameter portion 136 which engages in the enlarged portion 116 of chamber 114, but is of reduced height or length to allow a limited amount of relative movement or free play between piston 112 and chamber 114, and thus between piston rod 30 and adjustment rod 40. Chamber 116 is filled with oil or other substantially incompressible liquid. Communication between the opposite sides of portion 136 is provided via passageway 137 in which a one way spring-loaded valve 138 is located to control upward movement of piston 136 in chamber 116. This valve has an operation similar to that of valve 64 in the version illustrated in FIG. 2. Additionally, control knob 115 controls the projection of needle valve 117 into bleed orifice or passageway 119 which also connects the upper and lower portions of chamber 116 together to control downward movement of piston 136. Preferably, additional one-way valves such as ball valve 180 illustrated in FIG. 4 are provided for control of downward movement of piston 136. Each valve 180 is located in a passageway 182 through piston 136 and is controlled by spring 184. Preferably, a series of such valves is provided in passageways having varying diameters, and with springs of varying biassing force.

A reduced diameter end portion 139 of piston 112 engages in reduced diameter portion 140 of chamber 114, and is of smaller diameter than portion 140 to define an annular chamber communicating with chamber portion 116. An O-ring seal 144 isolates this chamber from internal chamber 118 of piston 112. Chamber 118 is a gas filled chamber and is connected via an inlet 150 controlled by a suitable inlet valve 152 to a gas supply, as best seen in FIG. 5. In FIG. 4, the annular chamber surrounding piston portion 139 has an equivalent operation to chamber 38 in FIG. 2, while the portion of chamber 116 above enlarged portion 136 of piston 112 is equivalent to the chamber above wall 37 in FIG. 2. The gas-filled chamber 118 has the equivalent biassing action to the gas-filled bladder 59 in FIG. 2, and the pressure in chamber 118 may be set as desired, for example at around 50 lbs. p.s.i. As in the embodiment of FIG. 2, any suitable alternative biassing mechanism may be used in alterative arrangements, for example a biassing spring.

The shock base assembly of FIG. 4 operates in much the same way as that of FIG. 2 but provides a softer stop. During normal travel on flat ground, the piston and adjusting rod will remain in the same relative positions, as illustrated in FIG. 4. Under normal flat road conditions, the weight of the vehicle and its occupant or occupants will be much greater than the base biassing pressure, so that the enlarged portion 136 of piston 112 will be at the lower end of chamber 116, as seen in FIG. 4. The rebound opening 42 Will therefore be at a minimum size.

When the wheels start to travel up one side of a bump, shock base cylinder 110 and adjusting rod 40 will also tend to move upwardly against the opposing force of the rebound spring 56, and the shock base piston 112 will travel with them, so that the parts tend to stay in the same relative positions as illustrated in FIG. 4. After travelling over the bump, the wheel pressure will drop, allowing the shock base piston to be urged upwardly in the cylinder 110 under the biassing pressure of gas in chamber 118, displacing oil from the upper side of enlarged portion 136 to the lower side via one way valve 138, so that the piston 112 and rod 40 move apart. This will have the effect of increasing the size of rebound orifice 42, as in the first embodiment of the invention, and thus increasing the rebound rate under the action of rebound spring 56. Once the wheel touches the ground again, or ground pressure starts to build up to normal levels, the piston 112 will start to move downwardly again at a rate controlled by the combined size of bleed orifice 119 and any of the additional valves 180 which is open, gradually decreasing the size of the rebound orifice and thus decreasing the rebound rate. By providing a series of valves with different biassing forces, the overall size of the passageway, and thus the speed at which piston 112 can move, will be dependent on how many valves 180 open, which in turn is dependent on the effective pressure in chamber 114. Thus, the higher the speed of the shock, the higher the effective pressure in chamber 114 will be, opening more valves 180 and producing a faster response. There may be up to eight ball valves 180 with a range of spring pressures. This allows the base assembly to be balanced more closely and accurately with movement of the upper end of the shock, and avoids the necessity of manually adjusting the shocks repeatedly for changing road conditions. Higher speed shocks will automatically produce a faster response than slow shocks, since more ball valves will open and piston 112 can therefore move faster. It will be understood that although valves 180 are shown as ball valves in passageways, any other types of valve may alternatively be used, such as spring-loaded flaps as at 27, 28 in FIG. 2, for example, in place of valves 180 in FIG. 4. Such flaps are inherently speed sensitive. The valves 180 in addition to adjuster 115, 117 will give an adjustable pressure versus speed profile. The compression stroke will have a relatively soft start and will become progressively firmer, producing a smoother ride. As in the first embodiment, the wheels will tend to follow the ground more closely, springing back towards the normal position after leaving a bump.

Although a preferred embodiment of the invention has been described above by way of example only, it will be understood by those skilled in the field that modifications may be made to the disclosed embodiment without departing from the scope of the invention, which is defined by the appended claims.

I claim:

1. A shock absorber assembly, comprising:
    a cylinder containing a substantially incompressible fluid;
    a piston slidably mounted in the cylinder to divide the cylinder into separate chambers on opposite sides of the piston;
    a hollow piston rod secured at one end to the piston and extending from the piston out of one end of the cylinder, the piston and piston rod having at least one fluid flow passageway connecting the chambers together;
    adjusting means slidably mounted in said piston rod for controlling the flow cross-section of said fluid flow passageway;
    base biassing means acting between said piston rod and said adjusting means for urging them relative to one another so as to increase the flow cross-section;
    rebound biassing means acting between said piston rod and said cylinder in a direction to urge said piston rod outwardly from said cylinder; and
    a shock base, slidably mounting means between said shock base and the extending end of said piston rod for allowing a predetermined limited amount of relative movement between said piston rod and shock base, said adjusting means being secured to said shock base and said base biassing means acting between said piston rod and shock base.

2. The assembly as claimed in claim 1, wherein said adjusting means comprises an adjusting rod slidably mounted in said hollow piston rod and projecting out of said piston rod at one end, the assembly further including an adjustable locking mechanism for securing said one end to said base assembly, the locking mechanism including means for manually adjusting the extension of said adjusting rod out of said piston rod.

3. The assembly as claimed in claim 1, wherein said chambers comprise a compression chamber and a rebound chamber, said piston rod extending out through said rebound chamber, said cylinder further including a first compensation chamber and a restricted flow passageway connecting said compression chamber to said compensation chamber, and a second, auxiliary compensation chamber and a flow passageway connecting said compression chamber to said auxiliary compensation chamber, each of said compensation chambers containing a pressurized, gas-filled bladder.

4. A shock absorber assembly, comprising:
    a cylinder containing a substantially incompressible fluid;
    a piston slidably mounted in the cylinder to divide the cylinder into separate chambers on opposite sides of the piston;
    a hollow piston rod secured at one end to the piston and extending from the piston out of one end of the cylinder, the piston and piston rod having at least one fluid flow passageway connecting the chambers together;

adjusting means slidably mounted in said piston rod for controlling the flow cross-section of said fluid flow passageway;

base biassing means acting between said piston rod and said adjusting means for urging them relative to one another so as to increase the flow cross-section;

a shock base;

slidable mounting means between said shock base and the extending end of said piston rod for allowing a predetermined limited amount of relative movement between said piston rod and shock base assembly, said adjusting means being secured to said shock base assembly and said base biassing means acting between said piston rod and shock base; and said shock base comprising a shock base cylinder, said piston rod having an enlarged head at its outer end slidably mounted in said shock base cylinder, and said biassing means acting between one end of said shock base cylinder and said piston rod.

5. The assembly as claimed in claim 4, wherein said biassing means comprises a pressurized, gas-filled chamber for biassing said enlarged head towards the opposite end of said shock base cylinder.

6. The assembly as claimed in claim 5, wherein said shock base cylinder includes a first chamber in which said enlarged head is slidably mounted, said chamber having a lower wall, and a second chamber on the opposite side of said lower wall, said gas-filled chamber comprising a gas-filled bladder located in said second chamber, at least one restricted fluid flow passageway being provided in said wall.

7. The assembly as claimed in claim 6, including a one way valve in said wall allowing fluid flow from said second chamber to said first chamber, and a restricted bleed orifice allowing restricted fluid flow between said chambers.

8. The assembly as claimed in claim 7, including manually variable adjusting means for varying the size of said bleed orifice.

9. The assembly as claimed in claim 4, including first valve means in said enlarged head for controlling movement of said piston rod in a first direction to increase the flow cross-section and second valve means in said enlarged head for controlling movement of said piston rod in the opposite direction.

10. The assembly as claimed in claim 9, wherein said second valve means has a variable flow cross-section proportional to the force applied to said enlarged head in said opposite direction.

11. A shock absorber assembly, comprising:

a first cylinder containing a substantially incompressible fluid;

a piston slidably mounted in said cylinder and dividing it into two separate chambers on opposite sides of said piston, one of said chambers comprising a compression chamber and the other chamber comprising a rebound chamber;

a piston rod secured at one end to said piston and projecting out through said rebound chamber out of one end of said cylinder;

a mounting assembly for mounting said piston rod and cylinder between a vehicle frame and wheel assembly;

a second, compensation cylinder containing a substantially incompressible fluid and a pressurized, gas-filled bladder in said compensation cylinder;

a restricted fluid passageway connecting said compensation cylinder to said compression chamber; and auxiliary compensation means for allowing fluid flow out of said compression chamber in a compression stroke of said piston, said auxiliary compensation means comprising an auxiliary compensation chamber containing a substantially incompressible fluid, a pressurized, gas-filled bladder in said auxiliary chamber; and a fluid passageway connecting said auxiliary chamber to said compression chamber.

12. A shock absorber assembly for mounting between a vehicle frame and wheel assembly comprising:

a shock absorber cylinder containing a substantially incompressible fluid;

a piston slidably mounted in said cylinder and dividing it into two separate chambers on opposite sides of said piston, one of said chambers comprising a compression chamber and the other of said chambers comprising a rebound chamber;

a hollow piston rod secured at one end to said piston and projecting through said rebound cylinder out of one end of said cylinder;

said piston and piston rod having at least one fluid passageway connecting said chambers together;

an adjustment rod slidably mounted in said hollow piston rod for controlling the flow cross-section of said passageway;

a shock base assembly;

slidable mounting means in said shock base assembly for slidably mounting the projecting end of said piston rod relative to said shock base assembly to allow a limited amount of axial movement of said piston rod relative to said shock base assembly;

securing means for connecting said adjustment rod to said shock base assembly; and biassing means between said shock base assembly and piston rod for urging said base assembly and piston rod apart to increase said flow cross-section.

* * * * *

UNITED STATES PATENT AND TRADEMARK OFFICE
CERTIFICATE OF CORRECTION

PATENT NO. : 5,094,325

DATED : March 10, 1992

INVENTOR(S) : J. MARLOW SMITH

It is certified that error appears in the above-identified patent and that said Letters Patent is hereby corrected as shown below:

Column 10, Line 35 "slidably" should read --slidable--

Signed and Sealed this

Twentieth Day of July, 1993

Attest:

MICHAEL K. KIRK

Attesting Officer   Acting Commissioner of Patents and Trademarks